United States Patent
Mooney et al.

(10) Patent No.: US 11,861,024 B1
(45) Date of Patent: Jan. 2, 2024

(54) SYSTEMS AND METHODS FOR DATA RISK ASSESSMENT

(71) Applicant: Wells Fargo Bank, N.A., San Francisco, CA (US)

(72) Inventors: Nadine Mooney, Denver, NC (US); Holly Angevine, Charlotte, NC (US); Elizabeth Hinshaw, Charlotte, NC (US); Richard Welsh, Charlotte, NC (US); Raziq Yaqub, Stewartsville, NJ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 378 days.

(21) Appl. No.: 15/881,149

(22) Filed: Jan. 26, 2018

(51) Int. Cl.
*G06F 21/60* (2013.01)
*G06F 21/62* (2013.01)

(52) U.S. Cl.
CPC ............ *G06F 21/604* (2013.01); *G06F 21/62* (2013.01)

(58) Field of Classification Search
CPC .................. G06F 21/604; G06F 21/62; G06F 2221/2141; G06F 21/60; G06F 16/33; H04L 29/06904; H04L 67/06; H04L 43/10; H04L 47/20
See application file for complete search history.

(56) References Cited

U.S. PATENT DOCUMENTS

| | | | | |
|---|---|---|---|---|
| 7,681,032 B2 * | 3/2010 | Peled | .................. | H04L 63/0245 713/154 |
| 7,861,252 B2 * | 12/2010 | Uszok | ..................... | H04L 29/06 709/202 |
| 8,127,133 B2 * | 2/2012 | Cross | .................. | G06F 21/6218 709/201 |
| 8,332,350 B2 * | 12/2012 | Pulfer | ................. | G06F 21/6218 707/783 |
| 8,407,194 B1 * | 3/2013 | Chaput | ................. | G06F 21/552 707/694 |
| 8,667,121 B2 | 3/2014 | Ahuja et al. | | |
| 8,694,455 B2 | 4/2014 | Eder | | |
| 8,924,412 B2 * | 12/2014 | Rhoads | .................. | G06Q 10/06 707/769 |
| 9,087,215 B2 * | 7/2015 | LaFever | ............. | H04L 63/0407 |
| 9,178,842 B2 * | 11/2015 | Pamidiparthi | .......... | H04L 51/14 |

(Continued)

*Primary Examiner* — Oleg Korsak
*Assistant Examiner* — Nhan Huu Nguyen
(74) *Attorney, Agent, or Firm* — K&L Gates LLP

(57) ABSTRACT

Systems, apparatuses, methods, and computer program products are disclosed for managing data usage. An example method includes monitoring electronic usage of a governed data set in a computing environment, wherein the governed data set comprises a governed business element, and wherein the governed business element comprises a business element and a metadata attribute configured to govern electronic usage of the business element. The example method further includes identifying, via a data compliance bot, transmission of an electronic usage request from a user device, wherein the electronic usage request comprises a request for a user of the user device to electronically use the business element in the computing environment. The example method further includes identifying the metadata attribute based on the business element. Subsequently, the example method includes determining whether electronic use of the business element is allowed.

20 Claims, 7 Drawing Sheets

(56) References Cited

U.S. PATENT DOCUMENTS

| | | | |
|---|---|---|---|
| 9,497,224 B2* | 11/2016 | Sweet | G06F 21/56 |
| 9,609,025 B1* | 3/2017 | Betzler | H04L 63/0245 |
| 9,619,661 B1* | 4/2017 | Finkelstein | G06F 21/6245 |
| 9,923,918 B2* | 3/2018 | Nicodemus | H04L 63/20 |
| 10,303,892 B1* | 5/2019 | Lim | G06F 16/93 |
| 10,360,394 B2* | 7/2019 | Arasan | G06F 21/604 |
| 10,387,669 B1* | 8/2019 | Lim | G06F 21/604 |
| 11,032,280 B1* | 6/2021 | Chhabra | H04L 63/0884 |
| 2004/0193606 A1* | 9/2004 | Arai | G06F 21/604 |
| | | | 707/999.009 |
| 2005/0177602 A1* | 8/2005 | Kaler | H04L 63/04 |
| 2005/0288994 A1 | 12/2005 | Haunschild | |
| 2007/0271306 A1* | 11/2007 | Brown | G06Q 10/06 |
| 2008/0060051 A1* | 3/2008 | Lim | G06F 21/604 |
| | | | 726/1 |
| 2008/0184329 A1* | 7/2008 | Cross | G06F 21/6218 |
| | | | 726/1 |
| 2008/0270802 A1* | 10/2008 | Ashley | G06F 21/10 |
| | | | 713/184 |
| 2009/0292930 A1* | 11/2009 | Marano | G06F 21/6218 |
| | | | 713/189 |
| 2009/0300711 A1* | 12/2009 | Tokutani | G06F 21/6218 |
| | | | 726/1 |
| 2010/0011000 A1* | 1/2010 | Chakra | G06F 21/6209 |
| | | | 707/E17.005 |
| 2010/0153432 A1* | 6/2010 | Pfeifer | G06F 16/289 |
| | | | 707/769 |
| 2010/0158254 A1* | 6/2010 | Schaad | G06F 21/6209 |
| | | | 380/282 |
| 2010/0262577 A1* | 10/2010 | Pulfer | G06F 16/93 |
| | | | 707/608 |
| 2010/0332401 A1* | 12/2010 | Prahlad | H04L 63/0428 |
| | | | 705/80 |
| 2011/0247074 A1* | 10/2011 | Manring | G06F 21/57 |
| | | | 726/26 |
| 2011/0307957 A1* | 12/2011 | Barcelo | G06F 21/552 |
| | | | 726/25 |
| 2012/0167197 A1* | 6/2012 | Kruger | G06F 12/00 |
| | | | 726/16 |
| 2013/0104190 A1* | 4/2013 | Simske | G06F 21/60 |
| | | | 726/1 |
| 2013/0219176 A1* | 8/2013 | Akella | G06F 16/185 |
| | | | 713/165 |
| 2013/0238510 A1* | 9/2013 | Wieboldt | G06Q 10/103 |
| | | | 705/301 |
| 2013/0246292 A1* | 9/2013 | Dick | G06Q 10/00 |
| | | | 705/317 |
| 2013/0326579 A1* | 12/2013 | Bhatti | G06F 19/00 |
| | | | 726/1 |
| 2014/0006347 A1* | 1/2014 | Qureshi | H04W 4/029 |
| | | | 707/621 |
| 2014/0032758 A1* | 1/2014 | Barton | H04L 63/102 |
| | | | 709/225 |
| 2014/0281514 A1* | 9/2014 | Erofeev | H04L 9/088 |
| | | | 713/165 |
| 2014/0283115 A1* | 9/2014 | Ben-Natan | G06F 21/60 |
| | | | 726/27 |
| 2015/0058619 A1* | 2/2015 | Sweet | H04L 63/0428 |
| | | | 713/155 |
| 2015/0074039 A1* | 3/2015 | Philip | G06F 16/24 |
| | | | 707/603 |
| 2015/0127804 A1* | 5/2015 | Kripalani | H04L 67/1097 |
| | | | 709/224 |
| 2015/0128287 A1* | 5/2015 | LaFever | G06F 21/6254 |
| | | | 726/27 |
| 2015/0154417 A1* | 6/2015 | Pasumarthi | G06F 21/6218 |
| | | | 726/30 |
| 2015/0286828 A1* | 10/2015 | Bulumulla | G06F 21/00 |
| | | | 726/28 |
| 2015/0317490 A1* | 11/2015 | Carey | G16B 50/00 |
| | | | 726/26 |
| 2016/0012221 A1* | 1/2016 | Antonelli | G06F 21/604 |
| | | | 726/22 |
| 2016/0036860 A1* | 2/2016 | Xing | H04L 63/20 |
| | | | 726/1 |
| 2016/0078203 A1* | 3/2016 | Moloian | G06F 21/40 |
| | | | 726/17 |
| 2016/0283727 A1* | 9/2016 | Linga | G06F 21/6209 |
| 2016/0321469 A1* | 11/2016 | Bhogal | G06F 21/6254 |
| 2016/0359915 A1* | 12/2016 | Gupta | H04L 43/04 |
| 2016/0366042 A1* | 12/2016 | Branson | H04L 65/61 |
| 2017/0063935 A1* | 3/2017 | Lim | H04L 67/42 |
| 2017/0097996 A1* | 4/2017 | Gullett | G06Q 10/063 |
| 2017/0140160 A1* | 5/2017 | Arasan | G06F 16/00 |
| 2017/0201545 A1* | 7/2017 | Nicodemus | H04L 63/102 |
| 2019/0034648 A1* | 1/2019 | Avrahami | G06F 21/6209 |
| 2019/0156053 A1* | 5/2019 | Vogel | G06F 21/6245 |

\* cited by examiner

SYSTEMS AND METHODS FOR DATA RISK ASSESSMENT

TECHNOLOGICAL FIELD

Example embodiments of the present disclosure relate generally to data management and, more particularly, to systems and methods for data risk assessment.

BACKGROUND

The inventors have discovered problems with existing mechanisms for data risk assessment. Through applied effort, ingenuity, and innovation, the inventors has solved many of these identified problems by developing solutions embodied by the present disclosure and described in detail below.

BRIEF SUMMARY

Systems, apparatuses, methods, and computer program products are disclosed herein for managing data usage. The data management system provided herein solves the above problems by monitoring electronic usage of business elements and determining whether electronic use of those business elements is allowed in particular computing environments, by particular user devices, by particular users of those user devices, or a combination thereof.

In one example embodiment, a computing system is provided for managing data usage. The computing system may comprise data monitoring circuitry configured to monitor electronic usage of a governed data set in a computing environment, wherein the governed data set comprises a governed business element, and wherein the governed business element comprises a business element and a metadata attribute configured to govern electronic usage of the business element. The data monitoring circuitry may be further configured to identify, via a data compliance bot, transmission of an electronic usage request from a user device, wherein the electronic usage request comprises a request for a user of the user device to electronically use the business element in the computing environment. The data monitoring circuitry may be further configured to identify the metadata attribute based on the business element. The computing system may further comprise data compliance circuitry in communication with the data monitoring circuitry and configured to, in response to identification of the transmission of the electronic usage request and identification of the metadata attribute, determine whether electronic use of the business element is allowed.

In another example embodiment, a computing apparatus is provided for managing data usage. The computing apparatus may comprise data monitoring circuitry configured to monitor electronic usage of a governed data set in a computing environment, wherein the governed data set comprises a governed business element, and wherein the governed business element comprises a business element and a metadata attribute configured to govern electronic usage of the business element. The data monitoring circuitry may be further configured to identify, via a data compliance bot, transmission of an electronic usage request from a user device, wherein the electronic usage request comprises a request for a user of the user device to electronically use the business element in the computing environment. The data monitoring circuitry may be further configured to identify the metadata attribute based on the business element. The computing apparatus may further comprise data compliance circuitry in communication with the data monitoring circuitry and configured to, in response to identification of the transmission of the electronic usage request and identification of the metadata attribute, determine whether electronic use of the business element is allowed.

In yet another example embodiment, a method is provided for managing data usage. The method may comprise monitoring, by data monitoring circuitry, electronic usage of a governed data set in a computing environment, wherein the governed data set comprises a governed business element, and wherein the governed business element comprises a business element and a metadata attribute configured to govern electronic usage of the business element. The method may further comprise identifying, by the data monitoring circuitry via a data compliance bot, transmission of an electronic usage request from a user device, wherein the electronic usage request comprises a request for a user of the user device to electronically use the business element in the computing environment. The method may further comprise identifying, by the data monitoring circuitry, the metadata attribute based on the business element. The method may further comprise, in response to identification of the transmission of the electronic usage request and identification of the metadata attribute, determining, by data compliance circuitry in communication with the data monitoring circuitry, whether electronic use of the business element is allowed.

In yet another example embodiment, a computer program product is provided for managing data usage. The computer program product may comprise at least one non-transitory computer-readable storage medium having computer-executable program code stored therein. The computer-executable program code may comprise program code instructions that, when executed, may cause a computing system to monitor electronic usage of a governed data set in a computing environment, wherein the governed data set comprises a governed business element, and wherein the governed business element comprises a business element and a metadata attribute configured to govern electronic usage of the business element. The program code instructions, when executed, may further cause the computing system to identify, via a data compliance bot, transmission of an electronic usage request from a user device, wherein the electronic usage request comprises a request for a user of the user device to electronically use the business element in the computing environment. The program code instructions, when executed, may further cause the computing system to identify the metadata attribute based on the business element. The program code instructions, when executed, may further cause the computing system to, in response to identification of the transmission of the electronic usage request and identification of the metadata attribute, determine whether electronic use of the business element is allowed.

The foregoing brief summary is provided merely for purposes of summarizing some example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized herein, some of which will be described in further detail below.

BRIEF DESCRIPTION OF THE FIGURES

The accompanying figures, which are not necessarily drawn to scale, illustrate embodiments and features of the present disclosure. Together with the specification, including the brief summary above and the detailed description below, the accompanying figures serve to explain the embodiments and features of the present disclosure. The components illustrated in the figures represent components that may or may not be present in various embodiments or features of the disclosure described herein. Accordingly, some embodiments or features of the present disclosure may include fewer or more components than those shown in the figures while not departing from the scope of the disclosure.

DETAILED DESCRIPTION

Figure 1:
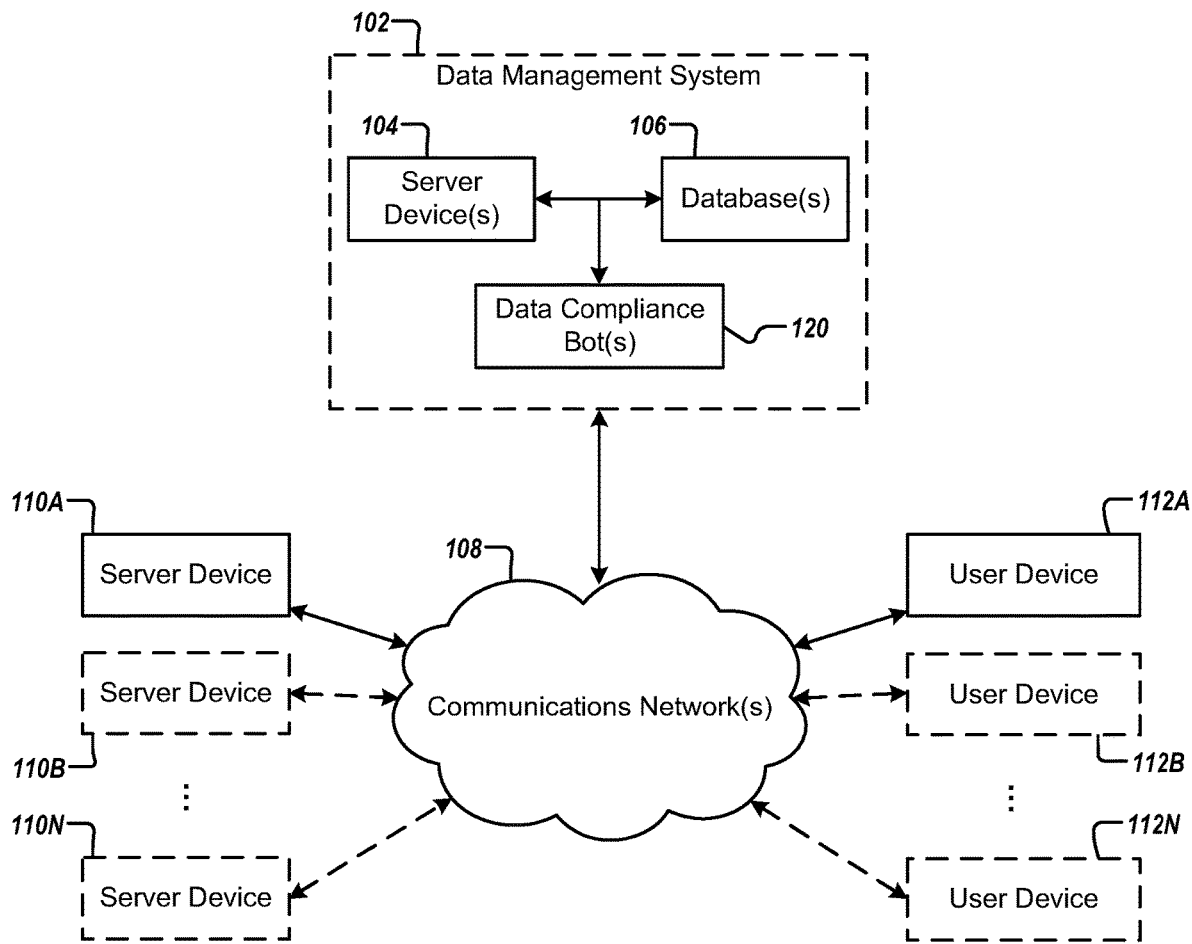
FIG. 1 illustrates a system diagram of a set of devices that may be involved in some example embodiments described herein.

Some embodiments of the present disclosure will now be described more fully hereinafter with reference to the accompanying figures, in which some, but not all embodiments of the disclosures are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Overview

As noted above, methods, apparatuses, systems, and computer program products are described herein that provide for managing data usage. Traditionally, there has been no reliable process for determining whether data is being used legally and/or correctly (e.g., in accordance with pre-determined metadata attributes governing the use of particular business elements) and identifying potential risks arising from the use of that data in various computing environments by various users and user devices.

In some embodiments, the present disclosure relates to a data management architecture that enables monitoring usage of data and flagging of improper or illegal uses of the data. In some embodiments, the data management architecture involves manipulating database systems to add a new metadata attribute for specific business elements. In some embodiments, the architecture further deploys data compliance "bots" throughout the system environment that can monitor movement of data from various local nodes within the environment. Each data compliance bot may be configured to evaluate whether data entering is in compliance with the metadata attributes governing use of its constituent business elements, and if not, the data compliance bot may generate an alert regarding potentially improper use of the data or, in some instances, disallow or prevent transmission or use of the data.

In one illustrative example embodiment, the present disclosure relates to a data management architecture that enables the monitoring of data to flag improper or illegal data usage by identifying business elements to track, developing rules regulating use of the identified business elements, and adding metadata attributes to the identified business elements that outline allowable uses of the business elements. The data management architecture then may disseminate data compliance "bots" throughout an entity's computing infrastructure. Each data compliance bot may comprise a beacon, plugin, agent, or standalone app that can monitor data entering or exiting a computing environment (e.g., the data compliance bot's local environment). In some instances, the data management architecture may require dissemination of data compliance bots to an external system before allowing access to data by devices within that external system.

In some embodiments, the data compliance bots may always or periodically monitor the use of data for compliance by intercepting data entering or exiting a computing environment (e.g., the data compliance bot's local environment), extracting the rules (e.g., metadata attributes) associated with each business element, and evaluating governed business elements included in the data to ensure compliance. The data compliance bot may also monitor common triggers for potential noncompliant uses of data even when rules appear to be followed, such as: a user in a computing environment (e.g., a local environment) emails a data set; a user in a computing environment employs the print screen function while viewing a data set; a data set is not used in a computing environment for its ostensible purpose; or a broader monitoring of users accessing data set, frequency of access, and the like for anomalous activity. In some embodiments, if a data compliance bot detects non-compliance, the data compliance bot may take remedial action by, for example, documenting the action, generating an alert including data regarding the non-compliance (e.g., the data regarding the non-compliance may include the business element used improperly, the systems involved, and any users involved), preventing the action, or a combination thereof.

There are many advantages of these and other embodiments described herein, such as: facilitating determination of whether data is used legally and/or correctly; facilitating identification of risks arising from improvident uses of data; improving data quality; and educating users on the proper use of data.

Definitions

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device or circuitry is described herein to receive data from a second computing device or circuitry, it will be appreciated that the data may be received directly from the second computing device or circuitry or may be received indirectly via one or more intermediary computing devices or circuitries, such as, for example, one or more servers, relays, routers, network access points, base stations, hosts, and/or the like, sometimes referred to herein as a "network." Similarly, where a first computing device or circuitry is described herein as sending data to a second computing device or circuitry, it will be appreciated that the data may be sent directly to the second computing device or circuitry or may be sent indirectly via one or more intermediary computing devices or circuitries, such as, for example, one or more servers, remote servers, cloud-based servers (e.g., cloud utilities), relays, routers, network access points, base stations, hosts, and/or the like.

The term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" is used herein to mean "serving as an example, instance, or illustration." Any implementation described herein as "example" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The terms "processor" and "processing circuitry" are used herein to refer to any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. The memory may also be located internal to another computing resource (e.g., enabling computer readable instructions to be downloaded over the Internet or another wired or wireless connection).

For the purposes of this description, a general reference to "memory" refers to memory accessible by the processors including internal memory or removable memory plugged into the device, remote memory (e.g., cloud storage), and/or memory within the processors themselves. For instance, memory may be any non-transitory computer readable medium having computer readable instructions (e.g., computer program instructions) stored thereof that are executable by a processor.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphone, headset, smartwatch, and similar electronic devices equipped with at least a processor configured to perform the various operations described herein. Devices such as smartphones, laptop computers, tablet computers, headsets, and smartwatches are generally collectively referred to as mobile devices.

The term "server" is used to refer to any computing device capable of functioning as a server, such as a master exchange server, web server, mail server, document server, or any other type of server. A server may be a dedicated computing device or a computing device including a server module (e.g., an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The terms "bot," "circuitry," "module," "software module," "utility," "cloud utility," "suite," and "software suite" (or other such terms) should be understood broadly to include hardware. In some embodiments, these terms may also include software for configuring the hardware. For example, in some embodiments, "circuitry" may include processing circuitry, memory, communications circuitry, and/or input-output circuitry. In another example, in some embodiments, a "bot" may include one or more beacons, plugins, agents, or standalone apps. In some embodiments, other elements of the present disclosure may provide or supplement the functionality of particular circuitry, modules, utilities, or suites.

The term "business element" refers to any data element included in a data set, such as user or customer information (e.g., name, address, age, social security number, preferences, etc.), account information (e.g., account number, age of account, account activity, etc.), a value (e.g., an account balance; a property value; an interest rate; a projected or future value; an average, median, or mean value; a standard deviation value; etc.), a matter requiring attention (MRA), protected health information (PHI), any other suitable data element, or any combination thereof.

Having set forth a series of definitions called-upon throughout this application, an example system architecture is described below for implementing example embodiments and features of the present disclosure.

System Architecture

Methods, systems, apparatuses, and computer program products of the present disclosure may be embodied by any of a variety of devices. For example, the method, system, apparatus, and computer program product of an example embodiment may be embodied by a networked device, such as one or more servers, remote servers, cloud-based servers (e.g., cloud utilities), "bots," or other network entities, configured to communicate with one or more devices, such as one or more server devices, user devices, data compliance bots, or a combination thereof. Example embodiments of the user devices include any of a variety of stationary or mobile computing devices, such as a portable digital assistant (PDA), mobile telephone, smartphone, laptop computer, tablet computer, a desktop computer, an electronic workstation, or any combination of the aforementioned devices.

FIG. 1 illustrates a system diagram of a set of devices that may be involved in some example embodiments described herein. In this regard, FIG. 1 discloses an example environment 100 within which embodiments of the present disclosure may operate to govern, monitor, and, in some instances, enforce compliance of data sets. As illustrated, a data management system 102 may be connected to one or more data management system server devices 104 in communication with one or more data management system databases 106. The data management system 102 may further be connected to one or more data compliance bots 120. The data management system 102 may be connected to one or more server devices 110A-110N (which may provide data sets, and possibly accompanying data regarding the data sets, to the data management system 102 for monitoring) and one or more user devices 112A-112N (by which information about data sets can be retrieved or provided by users or other entities that utilize the data sets) through one or more communications networks 108. In some embodiments, the data management system 102 may be configured to monitor and control electronic use of a data set provided by server device 110 as described in further detail below.

The data management system 102 may be embodied as one or more computers or computing systems as known in the art. In some embodiments, the data management system 102 may provide for receiving a data set from various sources, including but not necessarily limited to the server devices 110A-110N, the user devices 112A-112N, or both. The data set may comprise one or more business elements. The data management system 102 may further provide for generating one or more metadata attributes configured to govern electronic usage of some or all of the one or more business elements in the data set. The data management system 102 may further provide for generating one or more governed business elements, wherein each governed business element comprises comprising the business element and the metadata attribute generated for that business element. In some embodiments, the data management system 102 may provide for storing the governed data set in various sources, including but not necessarily limited to the server devices 110A-110N, the user devices 112A-112N, or both. In some instances, the data management system 102 may provide for storing the governed data set by linking the business elements and generated metadata attributes together using, for example, a linked list, struct, or other data structure that demonstrates the existence of an expressly inserted connection between the metadata attributes and the business elements.

In some embodiments, the data management system 102 may provide for monitoring electronic usage of the governed data set in a computing environment. The data management system 102 may provide for monitoring electronic usage of a plurality of governed data sets in a plurality of computing environments by deploying a plurality of data compliance bots (e.g., data compliance bots 120), wherein each of the plurality of data compliance bots is configured to monitor electronic usage of a respective governed data set in a respective computing environment. The data management system 102 may provide for identifying, via a data compliance bot (e.g., one of one or more data compliance bots 120), transmission of an electronic usage request from a user device. The electronic usage request may comprise a request for a user of the user device to electronically use the business element in the computing environment. The data management system 102 may further provide for identifying the metadata attribute based on the business element. The data management system 102 may further provide for, in response to identification of the transmission of the electronic usage request and identification of the metadata attribute, determining whether electronic use of the business element is allowed.

In some embodiments, the data management system 102 may further provide for generating an electronic control signal based on the determination of whether electronic use of the business element is allowed. In some embodiments, the electronic control signal may be an authorization signal, a transmission including a set of rules, or any other suitable electronic signal or data. In some embodiments, the electronic control signal may be configured to control an electronic use of the business element in the computing environment. In some embodiments, the electronic control signal may be interpreted or executed by a processor (e.g., processing circuitry 202) on the user device to effect the governance of the user device's actions. In some embodiments, the electronic control signal may update a usage policy stored in a memory (e.g., memory 204) of the user device. In some embodiments, the electronic control signal may include an authentication key enabling subsequent requests by the user device to be granted by the data management system. In some embodiments, the electronic control signal may comprise electronic notification content configured for display on a display device in communication with the user device. The electronic notification may comprise, for example, an alert (e.g., an audio alarm, a pop-up display screen overlay, an electronic message, an e-mail, a report, a log) including data regarding the non-compliance (e.g., the data regarding the non-compliance may include the business element used improperly, the systems involved, and any users involved), The data management system 102 may further provide for transmitting the electronic control signal to various devices, including but not necessarily limited to the server devices 110A-110N, the user devices 112A-112N, or both. In some embodiments, in response to identification of the transmission of the electronic usage request by a first user device 112A and identification of the metadata attribute, the data management system 102 may further provide for generating an electronic reporting signal and transmitting the electronic reporting signal to a second user device 112B.

The one or more data management system server devices 104 may be embodied as one or more servers, remote servers, cloud-based servers (e.g., cloud utilities), processors, "bots," or any other suitable server devices, or any combination thereof. The one or more data management system server devices 104 receive, process, generate, and transmit data, signals, and electronic information to facilitate the operations of the data management system 102.

The one or more data management system databases 106 may be embodied as one or more data storage devices, such as a Network Attached Storage (NAS) device or devices, or as one or more separate databases or servers. The one or more data management system databases 106 include information accessed and stored by the data management system 102 to facilitate the operations of the data management system 102. For example, the one or more data management system databases 106 may store user account credentials for users of one or more server devices 110A-110N, one or more user devices 112A-112N, or both. In another example, the one or more data management system databases 106 may store data regarding device characteristics of various server devices 110A-110N, user devices 112A-112N, or both.

The one or more data compliance bots 120 may be embodied as one or more processors, circuitries, servers, remote servers, cloud-based servers (e.g., cloud utilities), processors, or any other suitable bots, or any combination thereof. The one or more data compliance bots 120 may monitor, receive, process, generate, and transmit data, signals, and electronic information to facilitate the operations of the data management system 102. In some embodiments, the one or more data compliance bots 120 may comprise one or more beacons, plugins, agents, or standalone apps that can monitor data entering or exiting its local environment. In some embodiments, the one or more data compliance bots 120 may be active participants in system operations that receive electronic usage requests from user devices and transmit adjudicated responses. In some embodiments, the one or more data compliance bots 120 may be passive observers (or enabling intermediaries that are not part of the system) capable of seeing that an electronic usage request has been generated although they are not the direct recipients of the request. The one or more data compliance bots 120 are shown in FIG. 1 as being elements of data management system 102. In other embodiments (not shown in FIG. 1 for brevity), one or more of the one or more data compliance bots 120 may be elements of the one or more server devices 110A-110N, the one or more user devices 112A-112N, or a combination thereof. In some embodiments, the one or more data compliance bots 120 may be configured to crawl through various networks and computing environments using, in some instances, artificial intelligence.

The one or more server devices 110A-110N may be embodied by any computing device known in the art. In some embodiments, the one or more server devices 110A-110N may be embodied as one or more data storage devices, such as one or more NAS devices, or as one or more separate databases or database servers. In some embodiments, the one or more server devices 110A-110N may be embodied as one or more servers, remote servers, cloud-based servers (e.g., cloud utilities), processors, or any other suitable devices, or any combination thereof. In some embodiments, the one or more server devices 110A-110N may receive, process, generate, and transmit data, signals, and electronic information to facilitate the operations of the data management system 102. Information received by the data management system 102 from one or more server devices 110A-110N may be provided in various forms and via various methods. It will be understood, however, that in some embodiments, the one or more server devices 110A-110N need not themselves be databases or database servers, but may be peripheral devices communicatively coupled to databases or database servers.

In some embodiments, the one or more server devices 110A-110N may include or store various data and electronic information associated with one or more data sets. For example, the one or more server devices 110A-110N may include or store one or more data sets or one or more links or pointers thereto. In another example, the one or more server devices 110A-110N may include or store one or more governed data sets or one or more links or pointers thereto.

The one or more user devices 112A-112N may be embodied by any computing device known in the art. Information received by the data management system 102 from the one or more user devices 112A-112N may be provided in various forms and via various methods. For example, the one or more user devices 112A-112N may be laptop computers, smartphones, netbooks, tablet computers, wearable devices, desktop computers, electronic workstations, or the like, and the information may be provided through various modes of data transmission provided by these user devices.

In embodiments where a user device 112 is a mobile device, such as a smartphone or tablet, the mobile device may execute an "app" (e.g., a thin-client application) to interact with the data management system 102 and/or one or more server devices 110A-110N. Such apps are typically designed to execute on mobile devices, such as tablets or smartphones. For example, an app may be provided that executes on mobile device operating systems such as Apple Inc.'s iOS, Google LLC's Android®, or Microsoft Corporation's Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of individual users. In some embodiments, a mobile operating system may also provide for improved communication interfaces for interacting with external devices (e.g., server devices, user devices). Communication with hardware and software modules executing outside of the app is typically provided via application programming interfaces (APIs) provided by the mobile device operating system.

Additionally or alternatively, the one or more server devices 110A-110N, the one or more user devices 112A-112N, or any combination thereof may interact with the data management system 102 over one or more communications networks 108. As yet another example, the one or more server devices 110A-110N and/or the one or more user devices 112A-112N may include various hardware or firmware designed to interface with the data management system 102. For example, an example server device 110A may be a database server modified to communicate with the data management system 102, and another example server device 110B may be a purpose-built device offered for the primary purpose of communicating with the data management system 102. As another example, an example user device 112A may be a user's workstation and may have an application, such as a data compliance bot, stored thereon facilitating communication with the data management system 102.

Example Implementing Apparatus

Figure 2:
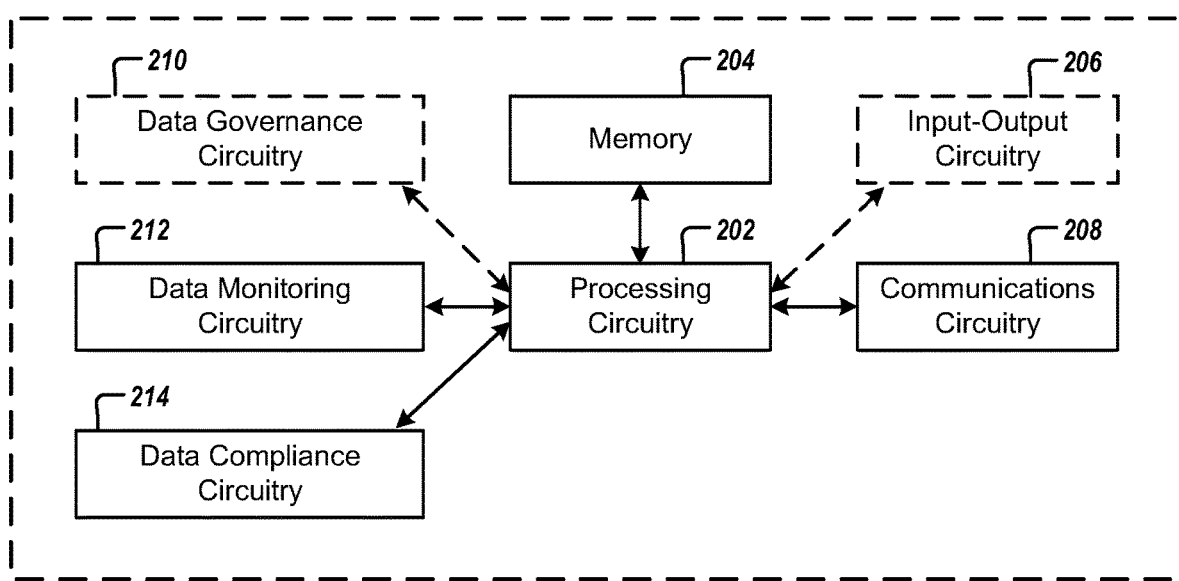
FIG. 2 illustrates a schematic block diagram of example circuitry that may perform various operations in accordance with some example embodiments described herein.

The data management system 102 described with reference to FIG. 1 may be embodied by one or more computing systems, such as apparatus 200 shown in FIG. 2. As illustrated in FIG. 2, the apparatus 200 may include processing circuitry 202, memory 204, input-output circuitry 206, communications circuitry 208, data governance circuitry 210, data monitoring circuitry 212, and data compliance circuitry 214. The apparatus 200 may be configured to execute the operations described above with respect to FIG. 1 and below with respect to FIGS. 3-7.

Although some of these components 202-212 are described with respect to their functional capabilities, it should be understood that the particular implementations necessarily include the use of particular hardware to implement such functional capabilities. It should also be understood that certain of these components 202-212 may include similar or common hardware. For example, two sets of circuitry may both leverage use of the same processor, network interface, storage medium, or the like to perform their associated functions, such that duplicate hardware is not required for each set of circuitry. It should also be appreciated that, in some embodiments, one or more of these components 202-212 may include a separate processor, specially configured field programmable gate array (FPGA), application specific interface circuit (ASIC), or cloud utility to perform the functions described herein.

The use of the terms "circuitry" and "bot" as used herein with respect to components of the apparatus 200 therefore includes particular hardware configured to perform the functions associated with respective circuitry or bot described herein. Of course, while the terms "circuitry" and "bot" should be understood broadly to include hardware, in some embodiments, circuitry or bots may also include software for configuring the hardware. For example, in some embodiments, "circuitry" may include processing circuitry, storage media, network interfaces, input-output devices, and other components. In some embodiments, other elements of the apparatus 200 may provide or supplement the functionality of particular circuitry. For example, the processing circuitry 202 may provide processing functionality, memory 204 may provide storage functionality, and communications circuitry 208 may provide network interface functionality, among other features.

In some embodiments, the processing circuitry 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present disclosure. For example, the memory 204 may be configured to store data and electronic information associated with one or more data sets and updates or revisions thereof. In some instances, the memory 204 may be configured to store one or more data sets or one or more links or pointers thereto. In some instances, the memory 204 may be configured to store one or more governed data sets comprising one or more governed business elements that each comprise a business element and one or more metadata attributes configured to govern electronic usage of the business element. It will be understood that the memory 204 may be configured to store any electronic information, data, metadata, business elements, metadata attributes, content, users, uses, applications, deployments, outcomes, embodiments, examples, figures, techniques, processes, operations, techniques, methods, systems, apparatuses, or computer program products described herein, or any combination thereof.

The processing circuitry 202 may be embodied in a number of different ways and may, for example, include one or more processing devices configured to perform independently. Additionally or alternatively, the processing circuitry 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processing circuitry 202 may be configured to execute instructions stored in the memory 204 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present disclosure while configured accordingly. As another example, when the processor is embodied as an executor of software instructions, the instructions may specifically configure the processor to perform the algorithms and/or operations described herein when the instructions are executed.

In some embodiments, the apparatus 200 may include input-output circuitry 206 that may, in turn, be in communication with processing circuitry 202 to provide output to the user and, in some embodiments, to receive an indication of a user input such as an electronic usage request provided by a user. The input-output circuitry 206 may comprise a user interface and may include a display that may include a web user interface, a mobile application, a client device, or any other suitable hardware or software. In some embodiments, the input-output circuitry 206 may also include a keyboard, a mouse, a joystick, a touch screen, touch areas, soft keys, a microphone, a speaker, or other input-output mechanisms. The processing circuitry 202 and/or input-output circuitry 206 (which may utilize the processing circuitry 202) may be configured to control one or more functions of one or more user interface elements through computer program instructions (e.g., software, firmware) stored on a memory (e.g., memory 204). Input-output circuitry 206 is optional and, in some embodiments, the apparatus 200 may not include input-output circuitry. For example, where the apparatus 200 does not interact directly with the user, the apparatus 200 may generate electronic notification content, electronic reporting content, or both for display by one or more other devices with which one or more users directly interact and transmit the generated content to one or more of those devices.

The communications circuitry 208 may be any device or circuitry embodied in either hardware or a combination of hardware and software that is configured to receive and/or transmit data from or to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. In some embodiments, the communication interface may include the circuitry for interacting with the antenna(s) to cause transmission of signals via the antenna(s) or to handle receipt of signals received via the antenna(s). These signals may be transmitted by the apparatus 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or any other suitable technologies. In addition, it should be understood that these signals may be transmitted using Wi-Fi, Near Field Communications (NFC), Worldwide Interoperability for Microwave Access (WiMAX) or other proximity-based communications protocols.

The data governance circuitry 210 includes hardware components designed or configured to receive a data set comprising one or more business elements. These hardware components may, for instance, utilize processing circuitry 202 to perform various computing operations and may utilize memory 204 for storage of data sets and/or other data received or generated by the data governance circuitry 210. The hardware components may further utilize communications circuitry 208 or any suitable wired or wireless communications path to communicate with a server device (e.g., one or more of server devices 110A-110N), a user device (e.g., one or more of user devices 112A-112N), data monitoring circuitry 212, data compliance circuitry 214, or any other suitable circuitry or device. For example, the data governance circuitry 210 may be in communication with one or more server devices (e.g., one or more server devices 110A-110N), and thus configured to receive the data set from the one or more server devices. In some embodiments, the data governance circuitry 210 may be configured to receive the data set from memory 204.

In some embodiments, the data governance circuitry 210 may include hardware components designed or configured to generate one or more metadata attributes configured to govern electronic usage of some or all of the one or more business elements in the data set. For example, the data governance circuitry 210 may generate one or more metadata attributes configured to govern electronic usage of business elements having permissions metadata (e.g., restricted access, confidential). Other circuitry (e.g., data monitoring circuitry 212) may automatically identify attempts to combine business elements having permissions metadata with other business elements, and other circuitry (e.g., data compliance circuitry 214) may determine, based on the metadata attributes, that the identified attempts to combine business elements having permissions metadata with other business elements are inappropriate uses of the business elements and disallow those attempts. In another example, the data governance circuitry 210 may generate one or more metadata attributes configured to govern electronic usage of business elements having personally identifiable information (PII) data (e.g., social security number, birth place, race, religious beliefs, any other data that might uniquely identify someone in a data set). When queries are run that contain PII data, other circuitry (e.g., data monitoring circuitry 212) may automatically identify and apply flags to those queries, and other circuitry (e.g., data compliance circuitry 214) may determine, based on the metadata attributes, that the identified queries are inappropriate uses of the business elements and disallow those queries. For instance, data monitoring circuitry 212 may search for ten digit numbers in a data set and, when a ten digit number is identified, apply a flag to that ten digit number. Similarly, data monitoring circuitry 212 may search for nine digit numbers in the data set and, when a nine digit number is identified, apply a flag to that ten digit number. Subsequently, data compliance circuitry 214 may evaluate the flagged ten digit numbers and nine digit numbers to ensure that no phone numbers or social security numbers are included in the data set. In some embodiments, the data governance circuitry 210 may use usage pattern recognition to identify inappropriate uses of business elements (e.g., in one or more computing environments, by one or more user devices, by one or more users, or a combination thereof) and generate one or more metadata attributes based on the identification of the inappropriate uses of the business elements.

In some embodiments, the data governance circuitry 210 may include hardware components designed or configured to generate one or more governed business elements, wherein each governed business element comprises both the business element itself and the metadata attribute generated for that business element. In some embodiments, the data governance circuitry 210 may include hardware components designed or configured to store the governed data set in various sources, including but not necessarily limited to the server devices 110A-110N, the user devices 112A-112N, or both. In some instances, the data management system 102 may provide for storing the governed data set by linking the business elements and generated metadata attributes together using, for example, a linked list, struct, or other data structure that demonstrates the existence of an expressly inserted connection between the metadata attributes and the business elements. For example, the data governance circuitry 210 may be in communication with one or more server devices (e.g., one or more server devices 110A-110N), and thus configured to store the governed data set in the one or more server devices. In some embodiments, the data governance circuitry 210 may be configured to store the governed data set in memory 204.

The data monitoring circuitry 212 includes hardware components designed or configured to monitor electronic usage of the governed data set in a computing environment. These hardware components may, for instance, utilize processing circuitry 202 to perform various computing operations and may utilize memory 204 for storage of data sets and/or other data received or generated by the data monitoring circuitry 212. The hardware components may further utilize communications circuitry 208 or any suitable wired or wireless communications path to communicate with a server device (e.g., one or more of server devices 110A-110N), a user device (e.g., one or more of user devices 112A-112N), data governance circuitry 210, data compliance circuitry 214, or any other suitable circuitry or device. In some embodiments, the data monitoring circuitry 212 may include hardware components designed or configured to monitor electronic usage of a plurality of governed data sets in a plurality of computing environments by deploying a plurality of data compliance bots (e.g., data compliance bots 120), wherein each of the plurality of data compliance bots is configured to monitor electronic usage of a respective governed data set in a respective computing environment. For example, the data monitoring circuitry 212 may deploy a plurality of data compliance bots by installing and activating a respective data compliance bot in each of a plurality of server devices or user devices where a governed data set is configured or expected to be used or accessed by a user in a computing environment (e.g., local environment).

In some embodiments, the data monitoring circuitry 212 may include hardware components designed or configured to identify, via a data compliance bot, transmission of an electronic usage request from a user device. The electronic usage request may comprise a request for a user of the user device to electronically use the business element in the computing environment. In some embodiments, the data monitoring circuitry 212 may include hardware components designed or configured to identify the metadata attribute based on the business element.

The data compliance circuitry 214 includes hardware components designed or configured to, in response to identification of the transmission of the electronic usage request and identification of the metadata attribute, determine whether electronic use of the business element is allowed. These hardware components may, for instance, utilize processing circuitry 202 to perform various computing operations and may utilize memory 204 for storage of data sets and/or other data received or generated by the data compliance circuitry 214. The hardware components may further utilize communications circuitry 208 or any suitable wired or wireless communications path to communicate with a server device (e.g., one or more of server devices 110A-110N), a user device (e.g., one or more of user devices 112A-112N), data governance circuitry 210, data monitoring circuitry 212, or any other suitable circuitry or device.

In some embodiments, the data compliance circuitry 214 may include hardware components designed or configured to generate an electronic control signal based on the determination of whether electronic use of the business element is allowed. The electronic control signal may be configured to control an electronic use of the business element in the computing environment. For example, the data compliance circuitry 214 may determine, based on the metadata attribute, that electronic use of the business element is allowed in the computing environment by the user of the user device. In another example, the data compliance circuitry 214 may determine, based on the metadata attribute, that electronic use of the business element is disallowed in the computing environment, by the user device, the user of the user device, or a combination thereof. In some embodiments, the electronic control signal may comprise electronic notification content configured for display on a display device in communication with the user device.

In some embodiments, the data compliance circuitry 214 may include hardware components designed or configured to, in response to identification of the transmission of the electronic usage request, determine, based on the metadata attribute, that electronic use of the business element is allowed, and generate an electronic control signal is configured to allow the user of the user device to electronically use the business element in the computing environment. For example, in response to identification of an electronic usage request indicative of a request for a high-level user (e.g., an administrator) to print the business element, the data compliance circuitry 214 may determine that printing of the business element is allowed for the high-level user and generate an electronic control signal configured to allow printing of the business element in the computing environment (e.g., local environment) by the high-level user. In another example, in response to identification of an electronic usage request indicative of a request for an executive-level user (e.g., a senior vice president) to generate a value (e.g., an average value) based on the business element, the data compliance circuitry 214 may determine that generating a value based on the business element is allowed for the executive-level user and generate an electronic control signal is configured to allow generation of the value in the computing environment by the executive-level user. In yet another example, in response to identification of an electronic usage request indicative of a request for an executive-level user (e.g., a senior vice president) to generate a value (e.g., an average value) based on the business element in an analytic computing environment, the data compliance circuitry 214 may determine that generating a value based on the business element is allowed in the analytic computing environment and generate an electronic control signal is configured to allow generation of the value in the analytic computing environment by the user of the user device.

In some embodiments, the data compliance circuitry 214 may include hardware components designed or configured to, in response to identification of the transmission of the electronic usage request, determine, based on the metadata attribute, that the electronic use of the business element is disallowed, and generate an electronic control signal configured to disallow the user of the user device to electronically use the business element in the computing environment. For example, in response to identification of an electronic usage request indicative of a request for a low-level user (e.g., a customer service agent) to print the business element, the data compliance circuitry 214 may determine that printing of the business element is disallowed for the low-level user and generate an electronic control signal configured to disallow printing of the business element in the computing environment by the low-level user. In another example, in response to identification of an electronic usage request indicative of a request for a publicly accessible user device (e.g., a public computer located at a school or library, a common computer located at an office or bank and commonly used by multiple employees) to generate a value (e.g., an average value) based on the business element, the data compliance circuitry 214 may determine that generating a value based on the business element is disallowed for the publicly available user device and generate an electronic control signal is configured to disallow generation of the value in the computing environment by the user of the publicly available computer device.

In some embodiments, the data compliance circuitry 214 may include hardware components designed or configured to transmit the electronic control signal to various devices, including but not necessarily limited to a server device (e.g., one or more server devices 110A-110N), a user device (e.g., one or more user devices 112A-112N), a data compliance bot (e.g., one or more data compliance bots 120), or any other suitable device or combination thereof. In some embodiments, the data compliance circuitry 214 may be configured to transmit a generated electronic control signal comprising electronic notification content to the input-output circuitry 206, and the input-output circuitry 206 may be configured to receive the electronic control signal and display the electronic notification content on one or more display screens.

In some embodiments, the data compliance circuitry 214 may include hardware components designed or configured to, in response to identification of the transmission of the electronic usage request by a first user device (e.g., user device 112A) and identification of the metadata attribute, generate an electronic reporting signal and transmit the electronic reporting signal to a second user device (e.g., user device 112B). In some embodiments, the data compliance circuitry 214 may be configured to transmit a generated electronic reporting signal to the input-output circuitry 206, and the input-output circuitry 206 may be configured to receive the electronic reporting signal and generate a display comprising one or more portions of the electronic reporting signal on one or more display screens.

In some embodiments, one or more of the data governance circuitry 210, data monitoring circuitry 212, and data compliance circuitry 214 may be hosted locally by the apparatus 200. In some embodiments, one or more of the data governance circuitry 210, data monitoring circuitry 212, and data compliance circuitry 214 may be hosted remotely (e.g., by one or more cloud servers) and thus need not physically reside on the apparatus 200. Thus, some or all of the functionality described herein may be provided by a third party circuitry. For example, the apparatus 200 may access one or more third party circuitries via any sort of networked connection that facilitates transmission of data and electronic information between the apparatus 200 and the third party circuitries. In turn, the apparatus 200 may be in remote communication with one or more of the data governance circuitry 210, data monitoring circuitry 212, and data compliance circuitry 214. In another example, the data governance circuitry 210 may be deployed as a first cloud utility, the data monitoring circuitry 212 may be deployed as a second cloud utility, and the data compliance circuitry 214 may be deployed as a third cloud utility. In some embodiments, one or more of the data governance circuitry 210, data monitoring circuitry 212, and data compliance circuitry 214 may be deployed as part of a data compliance bot.

In some embodiments, the apparatus 200 may be partially or wholly implemented as a data compliance bot, a server device, or a combination thereof. For example, a data compliance bot may comprise the data monitoring circuitry 212 and the data compliance circuitry 214. In another example, a server device may comprise the data monitoring circuitry 212 and the data compliance circuitry 214. In yet another example, the data compliance bot may comprise the data monitoring circuitry 212, and a server device may comprise the data compliance circuitry 214.

As will be appreciated, any such computer program instructions and/or other type of code may be loaded onto a computer, processor or other programmable apparatus's circuitry to produce a machine, such that the computer, processor, or other programmable circuitry that executes the code on the machine creates the means for implementing various functions, including those described herein.

As described above and as will be appreciated based on this disclosure, embodiments of the present disclosure may be configured as systems, apparatuses, methods, bots, mobile devices, backend network devices, computer program products, other suitable devices, and combinations thereof. Accordingly, embodiments may comprise various means including entirely of hardware or any combination of software with hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

The server devices 110A-110N and user devices 112A-112N may be embodied by one or more computing devices or systems that also may include processing circuitry, memory, input-output circuitry, and communications circuitry. For example, a server device 110 may be a database server on which computer code (e.g., C, C++, C #, java, a structured query language (SQL), a data query language (DQL), a data definition language (DDL), a data control language (DCL), a data manipulation language (DML)) is running or otherwise being executed by processing circuitry. In another example, a user device 112 may be a smartphone on which an app (e.g., a mobile database app) is running or otherwise being executed by processing circuitry. As it relates to operations described in the present disclosure, the functioning of these devices may utilize components similar to the similarly named components described above with respect to FIG. 2. Additional description of the mechanics of these components is omitted for the sake of brevity. These device elements, operating together, provide the respective computing systems with the functionality necessary to facilitate the communication of data (e.g., electronic marketing information, business analytic data, or the like) with the data management system described herein.

Figure 3:
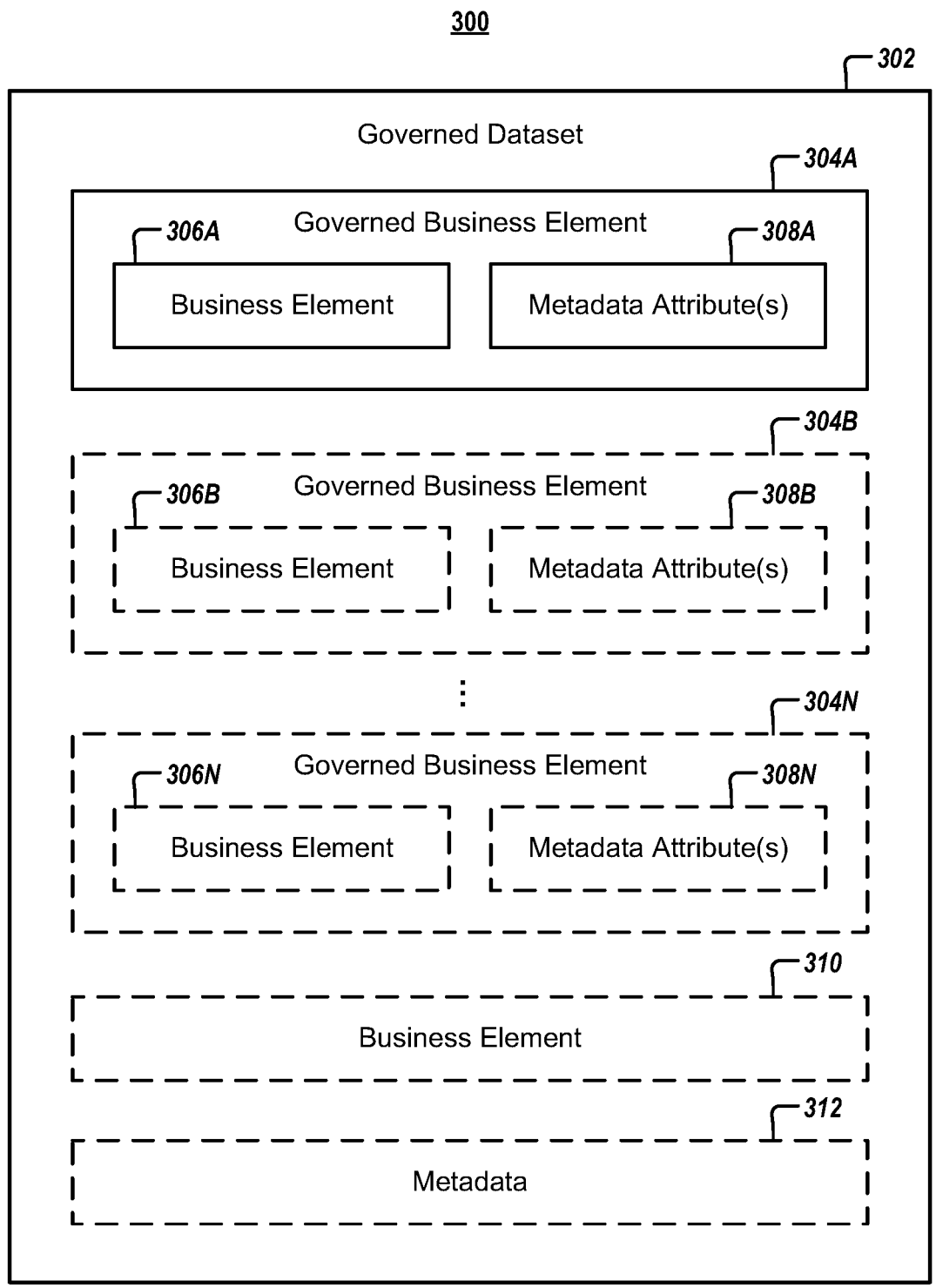
FIG. 3 illustrates example governed data set in accordance with some example embodiments described herein.

FIG. 3 illustrates example electronic information 300 comprising a governed data set 302. The governed data set 302 may comprise one or more governed business elements 304A-304N. Each of the one or more governed business elements 304A-304N may respectively comprise a business element 306A-306N and one or more metadata attributes 308A-308N. Each of the one or more business elements 306A-306N may comprise, for example, a data element such as user or customer information (e.g., name, address, age, social security number, preferences, etc.), account information (e.g., account number, age of account, account activity, etc.), a value (e.g., an account balance; a property value; an interest rate; a projected or future value; an average, median, or mean value; a standard deviation value; etc.), a matter requiring attention (MRA), protected health information (PHI), any other suitable data element, or any combination thereof. Each of the one or more metadata attributes 308A-308N may be respectively configured to govern electronic usage of the business element 306A-306N. The governed data set 302 may additionally comprise one or more business elements 310 (i.e., "non-governed" business elements), and metadata 312 (e.g., pointers, linked lists, structs, data structures, identification data indicative of an identity of governed data set 302).

In some embodiments, each of the one or more metadata attributes 308A-308N may respectively indicate that electronic use of the each of the business elements 306A-306N is allowed or disallowed in each of a plurality of computing environments, by each of a plurality of user devices, by each of a plurality of users, or any combination thereof. For example, the one or more metadata attributes 308A may indicate that a first electronic use (e.g., viewing) of the business element 306A is allowed in some or all computing environments, by some or all user devices, by some or all users, or a combination thereof. The one or more metadata attributes 308A may further indicate, for example, that a second electronic use (e.g., printing) of the business element 306A is disallowed in some or all computing environments, by some or all user devices, by some or all users, or a combination thereof.

In one illustrative example, the one or more metadata attributes 308A may indicate that printing of the business element 306A is allowed for a high-level user (e.g., an administrator) and disallowed for a low-level user (e.g., a customer service agent). In another illustrative example, the one or more metadata attributes 308B may indicate that generating a value (e.g., an average value) based on the business element 306B is allowed for an executive-level user (e.g., a senior vice president) and disallowed for any user of any publicly accessible user device (e.g., a public computer located at a school or library, a common computer located at an office or bank and commonly used by multiple employees). In another illustrative example, the one or more metadata attributes 308C (not shown) may indicate that sharing the business element 306C (not shown) (e.g., comprising a matter requiring attention (MRA) or protected health information (PHI)) with a contractor or vendor is disallowed for all user devices and all users. The one or more metadata attributes 308C may further indicate, for example, that transmitting the business element 306C via e-mail is allowed for an executive-level user and disallowed for all other users. The one or more metadata attributes 308C may further indicate, for example, that initiating a screen sharing application or program on a user device presently displaying or having access to the business element 306C is disallowed for all user devices and all users. The one or more metadata attributes 308C may further indicate, for example, that taking a screenshot (e.g., a digital image) of a display screen presently displaying or having access to the business element 306C is allowed for a data steward and disallowed for all other users. The one or more metadata attributes 308C may further indicate, for example, that using the business element 306C is allowed in an analytic computing environment and downloading the business element 306C is disallowed in the analytic computing environment.

Figure 4:
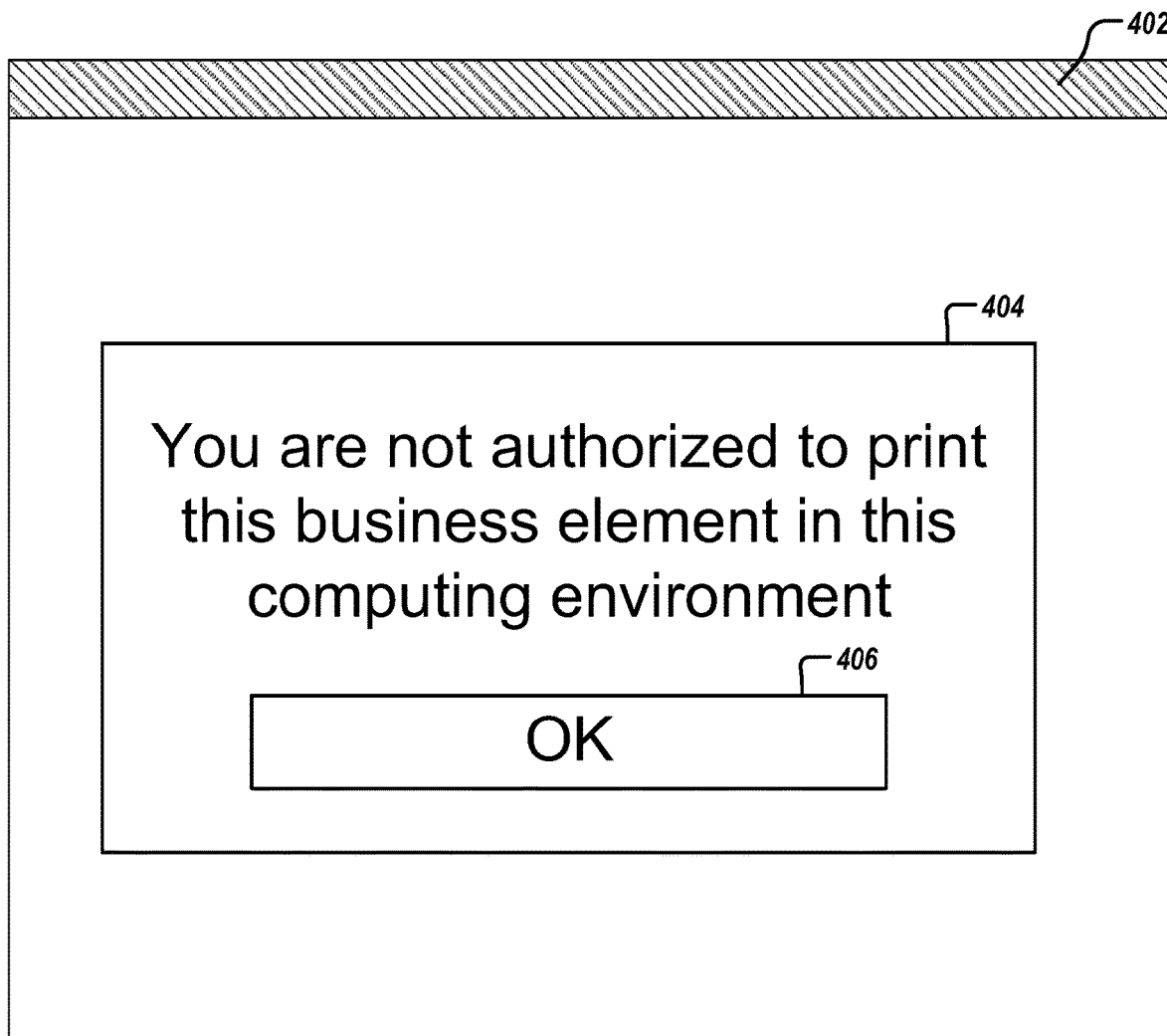
FIG. 4 illustrates an example user interface display screen in accordance with some example embodiments described herein.

FIG. 4 illustrates an example user interface display screen 400 in accordance with some example embodiments described herein. In some embodiments, generated electronic notification content may be configured to be displayed by a display device in display screen 400. As shown in FIG. 4, display screen 400 may comprise a header 402 for displaying an Internet Protocol (IP) address, a title, a computing environment name (e.g., "Data Set Revision Environment—Monitored"), any other suitable information, or any combination thereof. As further shown in FIG. 4, display screen 400 may comprise electronic notification content 404 (e.g., "You are not authorized to print this business element in this computing environment"; "You are not using this business element properly"; "WARNING: Possible disclosure of MRA to external contractor"; "WARNING: There may be legal implications arising from the requested use of this business element"). In some embodiments, electronic notification content 404 may be configured to be displayed by a display device as a display screen overlay. The display screen 400 may further comprise a button 406 (e.g., "OK") configured to close the electronic notification content 404, or otherwise alter the display screen 400, when clicked or selected by a user.

Figure 5:
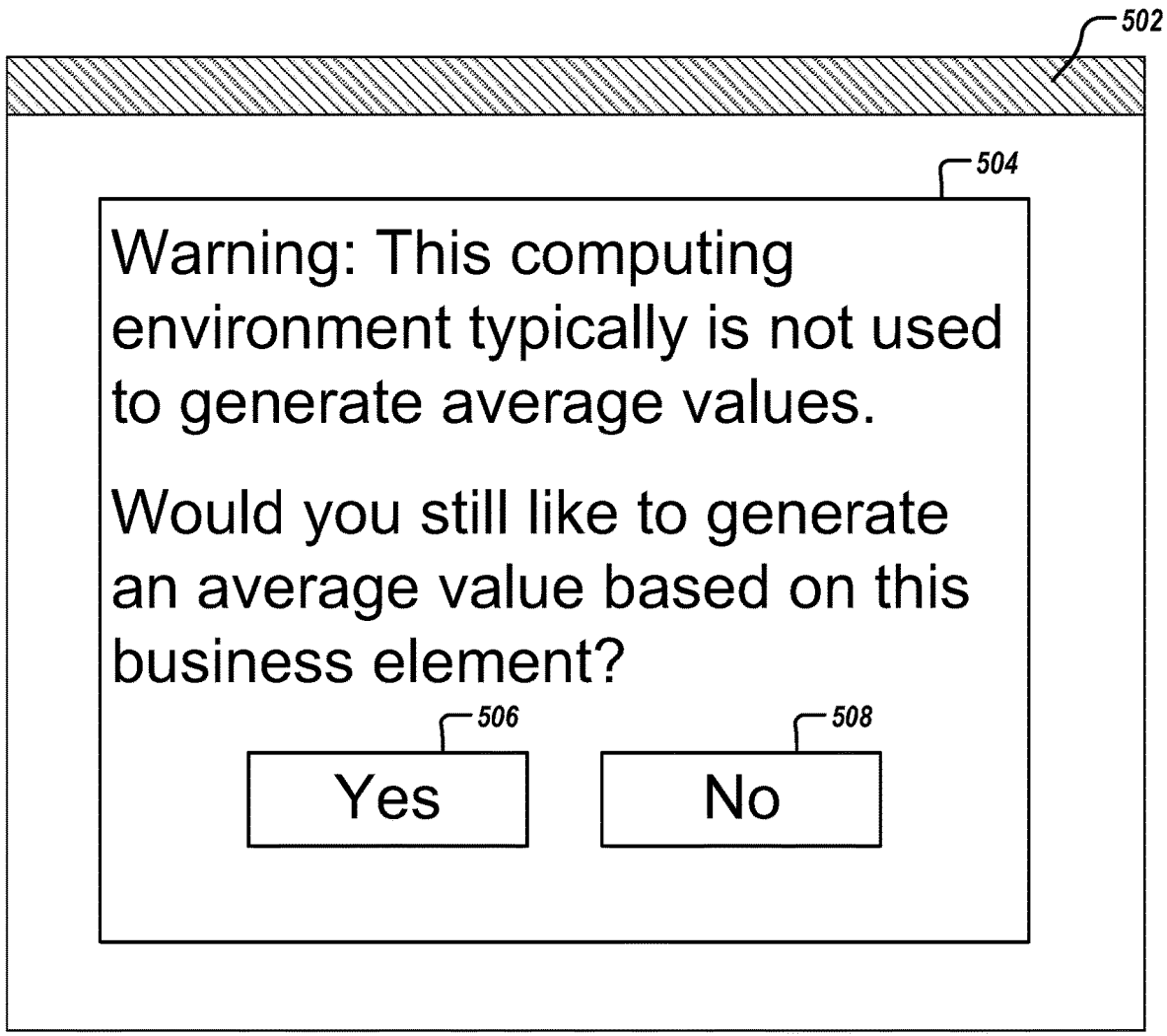
FIG. 5 illustrates another example user interface display screen in accordance with some example embodiments described herein.

FIG. 5 illustrates an example user interface display screen 500 in accordance with some example embodiments described herein. In some embodiments, generated electronic notification content may be configured to be displayed by a display device in display screen 500. As shown in FIG. 5, display screen 500 may comprise a header 502 for displaying an Internet Protocol (IP) address, a title, a computing environment name (e.g., "Data Set Viewing Environment—Monitored"), any other suitable information, or any combination thereof. As further shown in FIG. 5, display screen 500 may comprise electronic notification content 504 (e.g., "Warning: This computing environment typically is not used to generate average values. Would you still like to generate an average value based on this business element?"). In some embodiments, electronic notification content 504 may be configured to be displayed by a display device as a display screen overlay. The display screen 500 may further comprise a button 506 (e.g., "Yes") configured to allow the electronic use requested by the user when clicked or selected by the user. The display screen 500 may further comprise a button 508 (e.g., "No") configured to disallow the electronic use requested by the user when clicked or selected by the user.

Figure 6:
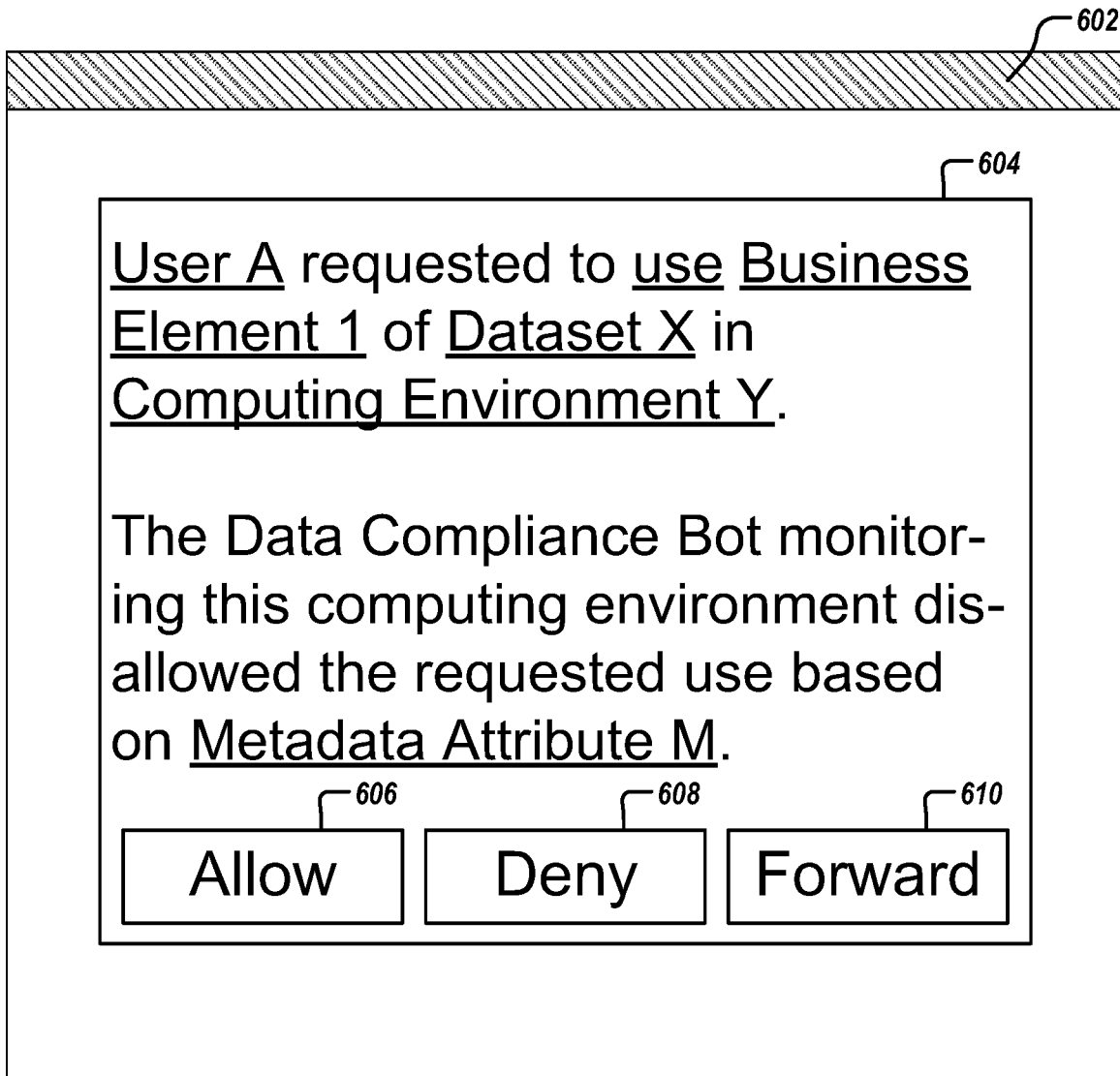
FIG. 6 illustrates another example user interface display screen in accordance with some example embodiments described herein.

FIG. 6 illustrates an example user interface display screen 600 in accordance with some example embodiments described herein. In some embodiments, one or more portions of electronic notification content, a generated electronic reporting signal, or both may be configured to be displayed by a display device in display screen 600. As shown in FIG. 6, display screen 600 may comprise a header 602 for displaying an Internet Protocol (IP) address, a title, a computing environment name (e.g., "Data Set Administrator Environment"), any other suitable information, or any combination thereof. As further shown in FIG. 6, display screen 600 may comprise electronic notification content 604 (e.g., "User A requested to use Business Element 1 of Dataset X in Computing Environment Y. The Data Compliance Bot monitoring this computing environment disallowed the requested use based on Metadata Attribute M."). In some embodiments, electronic notification content 604 may be configured to be displayed by a display device as a display screen overlay.

In some embodiments, electronic notification content 604 may comprise one or more selectable portions configured to provide additional information when clicked or selected by a user. For example, electronic notification content 604 may comprise the selectable text "User A" configured to provide, when clicked or selected by the second user (e.g., an administrator or data steward), a pop up display screen comprising identification data, access levels, and/or activity logs for the user associated with the electronic usage request (i.e., the first user that requested to electronically use the governed business element). In another example, electronic notification content 604 may comprise the selectable text "use" configured to provide, when clicked or selected by the second user, a pop up display screen comprising information indicative of the use associated with the electronic usage request. In another example, electronic notification content 604 may comprise the selectable text "Dataset X" configured to provide, when clicked or selected by the second user, a pop up display screen comprising identification data, access levels, and/or activity logs for the governed data set comprising the governed business element associated with the electronic usage request. In another example, electronic notification content 604 may comprise the selectable text "Computing Environment Y" configured to provide, when clicked or selected by the second user, a pop up display screen comprising identification data, access levels, and/or activity logs for the computing environment associated with the electronic usage request.

The display screen 600 may further comprise a button 606 (e.g., "Allow") configured to allow the electronic use requested by the user of the first user device when clicked or selected by the user (e.g., an administrator or data steward) of the second user device. The display screen 600 may further comprise a button 608 (e.g., "Deny") configured to disallow the electronic use requested by the user of the first user device when clicked or selected by the user of the second user device. The display screen 600 may further comprise a button 610 (e.g., "Forward") configured to transmit the electronic reporting signal to a third user device (e.g., a user device used by a higher level administrator or data steward).

There are many advantages provided by the display screens described herein with reference to FIGS. 4-6, such as: facilitating determination of whether data is used legally and/or correctly; facilitating identification of risks arising from improvident uses of data; improving data quality; and educating users on the proper use of data.

Having described specific components of example devices and display screens involved in various embodiments contemplated herein, example procedures for managing data usage are described below in connection with FIG. 7.

Example Operations for Managing Data Usage

Figure 7:
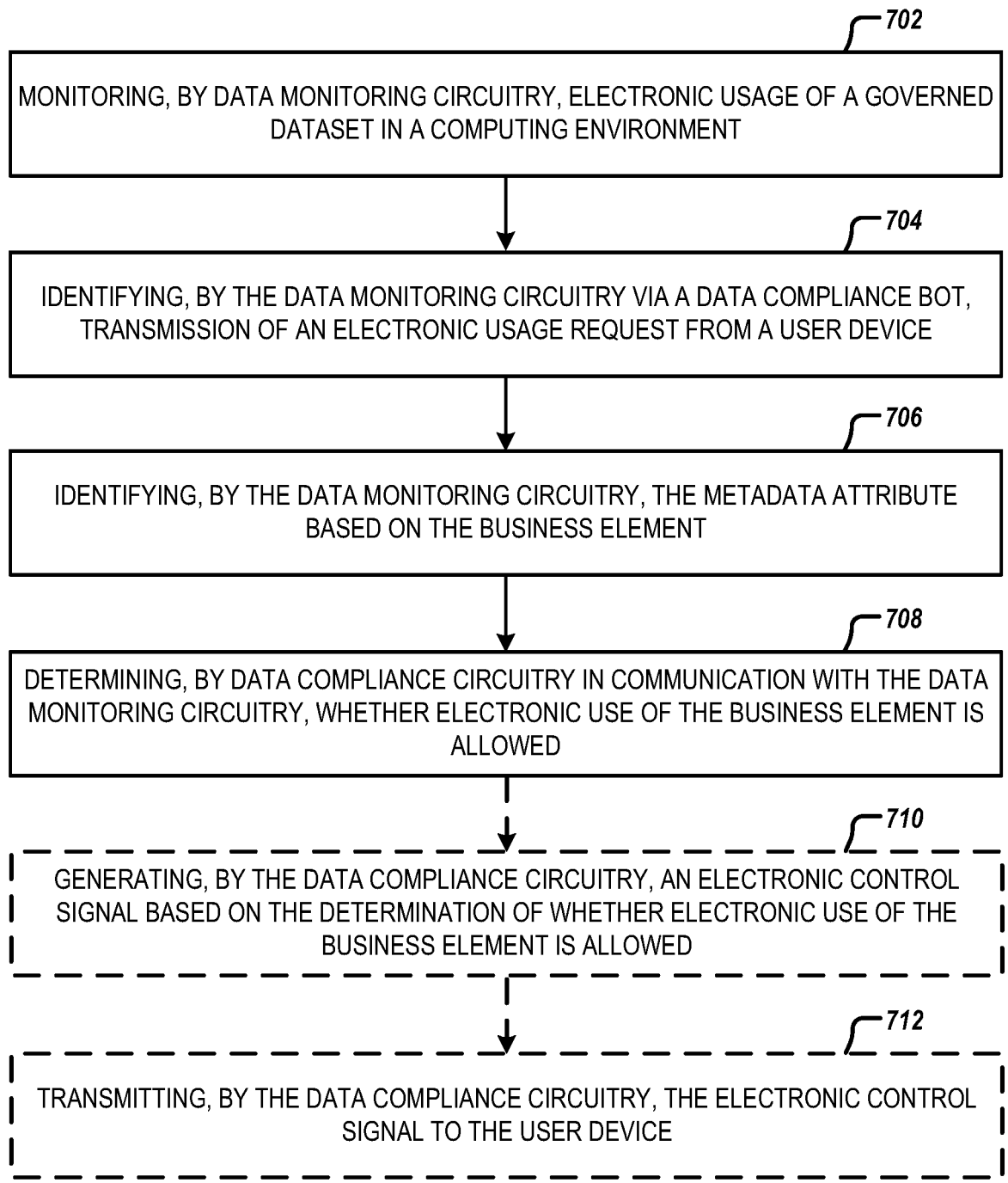
FIG. 7 illustrates an example flowchart for managing electronic usage of a governed data set in accordance with some example embodiments described herein.

Turning to FIG. 7, an example flowchart 700 is illustrated that contains example operations for managing electronic usage of a governed data set according to an example embodiment. The operations illustrated in FIG. 7 may, for example, be performed by one or more components described with reference to data management system 102 shown in FIG. 1, by a server device 110 or by a user device 112 in communication with data management system 102. In any case, the respective devices may be embodied by an apparatus 200, as shown in FIG. 2, by a data compliance bot 218 in communication with apparatus 200, or by any combination thereof. In some embodiments, the various operations described in connection with FIG. 7 may be performed by the apparatus 200 by or through the use of one or more of processing circuitry 202, memory 204, input-output circuitry 206, communications circuitry 208, data governance circuitry 210, data monitoring circuitry 212, data compliance circuitry 214, any other suitable circuitry, and any combination thereof.

As shown by operation 702, the apparatus 200 includes means, such as data monitoring circuitry 212 described with reference to FIG. 2 or the like, for monitoring electronic usage of a governed data set in a computing environment. The governed data set (e.g., governed data set 302 described with reference to FIG. 3) may comprise a governed business element (e.g., governed business element 304A), and the governed business element may comprise a business element (e.g., business element 306A) and a metadata attribute (e.g., one or more metadata attributes 308A) configured to govern electronic usage of the business element. For example, the apparatus 200 may actively monitor electronic usage of the governed data set in the computing environment by receiving electronic usage requests from user devices and transmitting adjudicated responses (e.g., electronic control signals as described below with reference to optional operations 710 and 712). In another example, the apparatus 200 may passively monitor electronic usage of the governed data set in the computing environment by seeing that an electronic usage request has been generated although they are not the direct recipients of the electronic usage requests and transmitting electronic reporting signals to other user devices (e.g., user devices used by administrators or data stewards). In some embodiments, the apparatus 200 may actively or passively monitor a governed data set in a tool (e.g., a tool used to house business elements for risk and regulatory reporting) by tracking from where the business elements are coming and to where the business elements are going. For example, if a business element is being sourced from an application that has a poor data quality rating, or that has not been certified for the ultimate usage of the business element, then the apparatus 200 may disallow the electronic usage of that business element for the intended report or system.

As shown by operation 704, the apparatus 200 includes means, such as the data monitoring circuitry 212 or the like, for identifying, via a data compliance bot (e.g., one of one or more data compliance bots 120 described with reference to FIG. 1), transmission of an electronic usage request from a user device. The electronic usage request may comprise a request for a user of the user device to electronically use the business element in the computing environment. For example, the apparatus 200 may identify, via a data compliance bot, transmission of an electronic usage request indicative of a request for a user of a user device to print the business element in the computing environment. In another example, the apparatus 200 may identify, via a data compliance bot, transmission of an electronic usage request indicative of a request for a user of a user device to generate a value in the computing environment based on the business element. In some embodiments, the apparatus 200 may itself comprise the data compliance bot, while in other embodiments, the apparatus 200 and the data compliance bot are distinct devices (in which case the data compliance bot may be a stand-alone device, a component of a third party device, or an agent or plugin hosted by the user device itself).

As shown by operation 706, the apparatus 200 includes means, such as the data monitoring circuitry 212 or the like, for identifying the metadata attribute based on the business element. For example, the apparatus 200 may identify one or more metadata attributes 308A based on a request to electronically use business element 306A. In some embodiments, identification of the metadata attribute may occur via reference to a lookup table or other data structure storing a data set that includes the business element and the corresponding metadata attribute, or that stores a mapping of the business element to its corresponding metadata attribute. In other embodiments, the business element itself may contain a pointer to a relevant data storage location at which the metadata element can be found.

As shown by operation 708, the apparatus 200 includes means, such as data compliance circuitry 214 described with reference to FIG. 2 or the like, for determining, in response to identification of the transmission of the electronic usage request and identification of the metadata attribute, whether electronic use of the business element is allowed. In some embodiments, the data compliance circuitry 214 at operation 708 may determine, based on the metadata attribute, that electronic use of the business element is allowed in the computing environment by the user of the user device. For example, in response to identification of an electronic usage request indicative of a request for a high-level user (e.g., an administrator) to print the business element, the data compliance circuitry 214 may determine that printing of the business element is allowed for the high-level user. In another example, in response to identification of an electronic usage request indicative of a request for an executive-level user (e.g., a senior vice president) to generate a value (e.g., an average value) based on the business element, the data compliance circuitry 214 may determine that generating a value based on the business element is allowed for the executive-level user.

In some embodiments, the data compliance circuitry 214 at operation 708 may determine, based on the metadata attribute, that electronic use of the business element is disallowed in the computing environment, by the user device, the user of the user device, or a combination thereof. For example, in response to identification of an electronic usage request indicative of a request for a low-level user (e.g., a customer service agent) to print the business element, the data compliance circuitry 214 may determine that printing of the business element is disallowed for the low-level user. In another example, in response to identification of an electronic usage request indicative of a request for a publicly accessible user device (e.g., a public computer located at a school or library, a common computer located at an office or bank and commonly used by multiple employees) to generate a value (e.g., an average value) based on the business element, the data compliance circuitry 214 may determine that generating a value based on the business element is disallowed for the publicly available user device. In another example, in response to identification of an electronic usage request indicative of a request to share a governed data set (e.g., comprising governed business elements such as matters requiring attention (MRAs) or protected health information (PHI)) with a contractor or vendor, the data compliance circuitry 214 may determine that sharing the governed data set with the contractor or vendor is disallowed. In another example, in response to identification of an electronic usage request indicative of a request to transmit a governed business element via e-mail, the data compliance circuitry 214 may determine that transmitting the governed business element via e-mail is disallowed. In another example, in response to identification of an electronic usage request indicative of a request to initiate a screen sharing application or program on a user device presently displaying or having access to a governed business element, the data compliance circuitry 214 may determine that initiating the screen sharing application is disallowed. In another example, in response to identification of an electronic usage request indicative of a request to take a screenshot (e.g., a digital image) of a display screen presently displaying or having access to a governed business element, the data compliance circuitry 214 may determine that taking the screenshot is disallowed.

Optionally, as shown by operation 710, the apparatus 200 may include means, such as the data compliance circuitry or the like, for generating an electronic control signal based on the determination of whether electronic use of the business element is allowed. The electronic control signal may be configured to control an electronic use of the business element in the computing environment. In some embodiments, in response to a determination that electronic use of the business element is allowed, the data compliance circuitry 214 may generate an electronic control signal configured to allow the user of the user device to electronically use the business element in the computing environment. In some embodiments, in response to a determination that electronic use of the business element is disallowed, the data compliance circuitry 214 may generate an electronic control signal configured to disallow the user of the user device to electronically use the business element in the computing environment. In one example, the electronic usage request may be indicative of a request to print the business element, and the electronic control signal may be configured to disallow printing of the business element in the computing environment by the user of the user device. In another example, the electronic usage request may be indicative of a request to generate a value based on the business element, and the electronic control signal may configured to disallow generation of the value in the computing environment by the user of the user device. In some embodiments, the electronic control signal may comprise electronic notification content configured for display on a display device in communication with the user device, or with one or more other user devices (e.g., user devices used by administrators or data stewards). The electronic notification content may comprise any suitable content, such as one or more portions of display screen 400, display screen 500, or display screen 600 respectively described with reference to FIGS. 4-6.

Optionally, as shown by operation 712, the apparatus 200 may include means, such as the data compliance circuitry or the like, for transmitting the electronic control signal. For example, the data compliance circuitry may transmit the electronic control signal to the user device, to a server device, or to a data compliance bot to control an electronic use of the business element in the computing environment. In some embodiments in which the user directly interacts with the apparatus 200 and wherein the electronic control signal comprises electronic notification content configured for display on a display device in communication with the user device, the data compliance circuitry may further produce a graphic, audio, or multimedia output of the electronic control signal via input-output circuitry 206. In other embodiments in which the user does not directly interact with the apparatus 200 (e.g., the apparatus 200 comprises a data management system 102, but the user interacts with a server device 110 or a user device 112 that is in communication with the data management system 102), the data compliance circuitry may utilize means, such as communications circuitry, for transmitting the electronic control signal. For example, the data compliance circuitry may transmit the electronic control signal to a server device 110 or a user device 112 for graphic, audio, or multimedia output via input-output circuitry of the server device 110 or the user device 112.

In some embodiments, FIG. 7 provides a reliable process for determining whether data is being used legally and/or correctly (e.g., in accordance with pre-determined metadata attributes governing the use of particular business elements) and identifying potential risks arising from the use of that data in various computing environments by various users and user devices. The flowchart operations generally provide for, in some embodiments: adding metadata attributes to data sets that outline the allowable use of the corresponding business elements; using metadata attributes to store rules governing use of data elements; using distributed set of data compliance bots throughout a system to monitor proper utilization of data elements; monitoring data utilization through both changes in the metadata for a data set as well as addition of data compliance bots throughout a system; requiring installation of bots as a requirement for accessing data being provided to a system (which enables enforcement of compliance data use policies for external systems); and detecting certain transmission triggers (e.g., printing, saving to portable media, print screen usage) and analyzing those triggers for authorization based on the user performing the triggering function. There are many advantages of these and other operations described herein, such as: facilitating determination of whether data is used legally and/or correctly; facilitating identification of risks arising from improvident uses of data; improving data quality; and educating users on the proper use of data.

FIG. 7 thus illustrates an example flowchart describing the operation of various systems (e.g., data management system 102 described with reference to FIG. 1), apparatuses (e.g., apparatus 200 described with reference to FIG. 2), methods, and computer program products according to example embodiments contemplated herein. It will be understood that each operation of the flowchart, and combinations of operations in the flowchart, may be implemented by various means, such as hardware, firmware, processor, circuitry, and/or other devices associated with execution of software including one or more computer program instructions. For example, one or more of the procedures described above may be performed by execution of computer program instructions. In this regard, the computer program instructions that, when executed, cause performance of the procedures described above may be stored by a memory (e.g., memory 204) of an apparatus (e.g., apparatus 200) and executed by a processor (e.g., processing circuitry 202) of the apparatus. As will be appreciated, any such computer program instructions may be loaded onto a computer or other programmable apparatus (e.g., hardware) to produce a machine, such that the resulting computer or other programmable apparatus implements the functions specified in the flowchart operations. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart operations. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart operations.

The flowchart operations described with reference to FIG. 7 support combinations of means for performing the specified functions and combinations of operations for performing the specified functions. It will be understood that one or more operations of the flowchart, and combinations of operations in the flowchart, can be implemented by special purpose hardware-based computer systems which perform the specified functions, or combinations of special purpose hardware and computer instructions. In some embodiments, one or more operations of the flowchart, and combinations of operations in the flowchart, may be implemented by one or more data compliance bots (e.g., one or more data compliance bots 120 described with reference to FIG. 1). In some embodiments, one or more operations of the flowchart, and combinations of operations in the flowchart, may be implemented by a server device (e.g., data management system server device 104 or server device 110 described with reference to FIG. 1), wherein the one or more data compliance bots are thin clients that pass-through indications of user actions in their respective settings. In one example, a data compliance bot may comprise the data monitoring circuitry and the data compliance circuitry and implement the flowchart operations described with reference thereto. In another example, a server device may comprise the data monitoring circuitry and the data compliance circuitry and implement the flowchart operations described with reference thereto. In yet another example, a data compliance bot may comprise the data monitoring circuitry and implement the flowchart operations described with reference thereto, and a server device may comprise the data compliance circuitry and implement the flowchart operations described with reference thereto.

Conclusion

While various embodiments in accordance with the principles disclosed herein have been shown and described above, modifications thereof may be made by one skilled in the art without departing from the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present disclosure. Furthermore, any advantages and features described above may relate to specific embodiments, but shall not limit the application of such issued claims to processes and structures accomplishing any or all of the above advantages or having any or all of the above features.

In addition, the section headings used herein are provided for consistency with the suggestions under 37 C.F.R. 1.77 or to otherwise provide organizational cues. These headings shall not limit or characterize the disclosure set out in any claims that may issue from this disclosure. For instance, a description of a technology in the "Background" is not to be construed as an admission that certain technology is prior art to any disclosure in this disclosure. Neither is the "Summary" to be considered as a limiting characterization of the disclosure set forth in issued claims. Furthermore, any reference in this disclosure to "disclosure" or "embodiment" in the singular should not be used to argue that there is only a single point of novelty in this disclosure. Multiple embodiments of the present disclosure may be set forth according to the limitations of the multiple claims issuing from this disclosure, and such claims accordingly define the disclosure, and their equivalents, that are protected thereby. In all instances, the scope of the claims shall be considered on their own merits in light of this disclosure, but should not be constrained by the headings set forth herein.

Also, techniques, systems, subsystems, and methods described and illustrated in the various embodiments as discrete or separate may be combined or integrated with other systems, modules, techniques, or methods without departing from the scope of the present disclosure. Other devices or components shown or discussed as coupled to, or in communication with, each other may be indirectly coupled through some intermediate device or component, whether electrically, mechanically, or otherwise. Other examples of changes, substitutions, and alterations are ascertainable by one skilled in the art and could be made without departing from the scope disclosed herein.

Many modifications and other embodiments of the disclosure set forth herein will come to mind to one skilled in the art to which these embodiments pertain having the benefit of teachings presented in the foregoing descriptions and the associated figures. Although the figures only show certain components of the apparatus and systems described herein, it is understood that various other components may be used in conjunction with the supply management system. Therefore, it is to be understood that the disclosure is not to be limited to the specific embodiments disclosed and that modifications and other embodiments are intended to be included within the scope of the appended claims. For example, the various elements or components may be combined, rearranged, or integrated in another system or certain features may be omitted or not implemented. Moreover, the steps in any method described above may not necessarily occur in the order depicted in the accompanying figures, and in some cases one or more of the steps depicted may occur substantially simultaneously, or additional steps may be involved. Although specific terms are employed herein, they are used in a generic and descriptive sense only and not for purposes of limitation.

What is claimed is:

1. A system for managing data usage, the system comprising:

data monitoring circuitry configured to:

monitor electronic usage of a governed data set in a computing environment, wherein the governed data set includes a governed business element, and wherein the governed business element includes a business element and at least one metadata attribute configured to govern electronic usage of the business element, identify, via a data compliance bot, transmission of an electronic usage request from a user device, wherein the electronic usage request comprises a request for a user of the user device to electronically perform one or more actions on the business element in the computing environment, wherein the one or more actions include application of analytics to at least a portion of the business element to generate values in the computing environment, identify a metadata attribute of the at least one metadata attribute based on the business element, wherein the metadata attribute governs usage of the business element to calculate values in different computing environments, monitor the governed data set entering or exiting the computing environment for detecting any of a plurality of instances of non-compliant or potential non-compliant use of the governed data set by analysis of use pattern of the business element, wherein an instance of non-compliant or potential non-compliant use of the governed data set comprises generation, by the user, of an average value based on the business element, disallow an attempt by the user to generate the average value based on the business element, generate a new metadata attribute based on the analysis and identification of sensitive data within the business element, and link the business element and the new metadata attribute together; and data compliance circuitry in communication with the data monitoring circuitry and configured to:

in response to identification of the transmission of the electronic usage request and identification of the at least one metadata attribute including the metadata attribute and the new metadata attribute, determine whether electronic use of the business element is allowed.

2. The system of claim 1, wherein the data compliance circuitry is further configured to:

generate an electronic control signal based on the determination of whether electronic use of the business element is allowed, wherein the electronic control signal is configured to control an electronic use of the business element in the computing environment, and transmit the electronic control signal.

3. The system of claim 2, wherein, in response to identification of the transmission of the electronic usage request, the data compliance circuitry is further configured to:

determine, based on the at least one metadata attribute, that electronic use of the business element is allowed, wherein the electronic control signal is configured to allow the user of the user device to electronically use the business element in the computing environment.

4. The system of claim 2, wherein, in response to identification of the transmission of the electronic usage request, the data compliance circuitry is further configured to:

determine, based on the at least one metadata attribute, that the electronic use of the business element is disallowed, wherein the electronic control signal is configured to disallow the user of the user device to electronically use the business element in the computing environment.

5. The system of claim 2, comprising:

determining the computing environment comprises an analytic computing environment, wherein the electronic control signal is configured to allow generation of the average value in the computing environment by the user of the user device based on the computing environment comprising the analytic computing environment.

6. The system of claim 2, wherein the one or more actions include combining the business element with a second business element, and wherein the electronic control signal is configured to disallow combining of the business element with the second business element based on determining an absence of any metadata attributes configured to govern electronic usage of the second business element.

7. The system of claim 1, wherein the user device is a first user device, and wherein the data compliance circuitry is further configured to:

in response to identification of the transmission of the electronic usage request and identification of the metadata attribute, generate an electronic reporting signal; and transmit the electronic reporting signal to a second user device in communication with the data compliance circuitry, wherein receipt of the electronic reporting signal by the second user device causes the second user device to generate, on a user interface, electronic notification content including an indication the user requested use of the business element in the computing environment, wherein the indication of the user in the electronic notification content is selectable, and wherein selection of the indication of the user in the electronic notification content causes a pop up, in the user interface, that displays one or more of identification data, access levels, and activity logs for the user.

8. The system of claim 1, further comprising the data compliance bot, wherein the data compliance bot comprises the data monitoring circuitry and the data compliance circuitry.

9. The system of claim 1, further comprising a server device comprising the data monitoring circuitry and the data compliance circuitry.

10. The system of claim 1, further comprising:

the data compliance bot, wherein the data compliance bot comprises the data monitoring circuitry; and a server device comprising the data compliance circuitry.

11. The system of claim 1, comprising:

determining the computing environment comprises a local computing environment;

generating, on a user interface, electronic notification content including an indication that local computing environments are not typically used to generate average values; and generating, on the user interface, a first button and a second button, wherein selection of the first button proceeds with generation of the average value and selection of the second button cancels the generation of the average value.

12. A method for managing data usage, the method comprising:

monitoring, by data monitoring circuitry, electronic usage of a governed data set in a computing environment, wherein the governed data set comprises a governed business element, and wherein the governed business element comprises a business element and at least one metadata attribute configured to govern electronic usage of the business element;

identifying, by the data monitoring circuitry via a data compliance bot, transmission of an electronic usage request from a user device, wherein the electronic usage request comprises a request for a user of the user device to electronically use the business element in the computing environment, wherein electronic use of the business element includes application of analytics to at least a portion of the business element to generate values in the computing environment;

identifying, by the data monitoring circuitry, a metadata attribute of the at least one metadata attribute based on the business element, wherein the metadata attribute governs usage of the business element to calculate values in different computing environments;

monitoring the governed data set entering or exiting the computing environment for detecting any of a plurality of instances of non-compliant or potential non-compliant use of the governed data set by analysis of use pattern of the business element, wherein an instance of noncompliant or potential non-compliant use of the governed data set comprises generation, by the user, of an average value based on the business element;

disallowing an attempt by the user to generate the average value based on the business element;

generating a new metadata attribute based on the analysis and identification of sensitive data within the business element;

linking the business element and the new metadata attribute together; and in response to identification of the transmission of the electronic usage request and identification of the at least one metadata attribute including the metadata attribute and the new metadata attribute, determining, by data compliance circuitry in communication with the data monitoring circuitry, whether electronic use of the business element is allowed.

13. The method of claim 12, further comprising:
generating, by the data compliance circuitry, an electronic control signal based on the determination of whether electronic use of the business element is allowed, wherein the electronic control signal is configured to control an electronic use of the business element in the computing environment, and
transmitting, by the data compliance circuitry, the electronic control signal.

14. The method of claim 13, further comprising:
determining, by the data compliance circuitry based on the at least one metadata attribute, that electronic use of the business element is allowed,
wherein the electronic control signal is configured to allow the user of the user device to electronically use the business element in the computing environment.

15. The method of claim 13, further comprising:
determining, by the data compliance circuitry based on the at least one metadata attribute, that electronic use of the business element is disallowed,
wherein the electronic control signal is configured to disallow the user of the user device to electronically use the business element in the computing environment.

16. The method of claim 13, wherein the electronic control signal comprises electronic notification content configured for display on a display device in communication with the user device.

17. The method of claim 12, wherein the user device is a first user device, the method further comprising:
in response to identification of the transmission of the electronic usage request and identification of the metadata attribute, generating, by the data compliance circuitry, an electronic reporting signal; and
transmitting, by the data compliance circuitry, the electronic reporting signal to a second user device in communication with the data compliance circuitry.

18. The method of claim 12, further comprising deploying, by the data monitoring circuitry, a plurality of data compliance bots, wherein each of the plurality of data compliance bots is configured to monitor electronic usage of a respective governed data set in a respective computing environment.

19. A computer program product for managing data usage, the computer program product comprising at least one non-transitory computer-readable storage medium storing program instructions that, when executed, cause an apparatus to:
monitor electronic usage of a governed data set in a computing environment, wherein the governed data set comprises a governed business element, and wherein the governed business element comprises a business element and at least one metadata attribute configured to govern electronic usage of the business element;
identify, via a data compliance bot, transmission of an electronic usage request from a user device, wherein the electronic usage request comprises a request for a user of the user device to electronically perform one or more actions on the business element in the computing environment, wherein the one or more actions include application of analytics to at least a portion of the business element to generate values in the computing environment;
identify a metadata attribute of the at least one metadata attribute based on the business element, wherein the metadata attribute governs usage of the business element to calculate values in different computing environments;
monitor the governed data set entering or exiting the computing environment for detecting any of a plurality of instances of non-compliant or potential non-compliant use of the governed data set by analysis of use pattern of the business element, wherein an instance of non-compliant or potential non-compliant use of the governed data set comprises generation, by the user, of an average value based on the business element;
disallow an attempt by the user to generate the average value based on the business element;
generate a new metadata attribute based on the analysis and identification of sensitive data within the business element;
link the business element and the new metadata attribute together; and
in response to identification of the transmission of the electronic usage request and identification of the at least one metadata attribute including the metadata attribute and the new metadata attribute, determine whether electronic use of the business element is allowed.

20. The computer program product of claim 19, wherein the program instructions, when executed, further cause the apparatus to:
generate an electronic control signal based on the determination of whether electronic use of the business element is allowed, wherein the electronic control signal is configured to control an electronic use of the business element in the computing environment; and
transmit the electronic control signal.

* * * * *